United States Patent [19]

Cowan et al.

[11] Patent Number: 5,167,243
[45] Date of Patent: Dec. 1, 1992

[54] DISINFESTATION SYSTEM FOR AGRICULTURAL PRODUCTS

[75] Inventors: Floyd S. Cowan, Southerlin, Va.; David A. Grider, Greensboro, N.C.; Ricky L. Hughes, Greensboro, N.C.; Neil A. Thaggard, Greensboro, N.C.; John R. Wagner, Greensboro, N.C.; Leroy G. Webb, Greensboro, N.C.; James G. Williams, III, High Point, N.C.

[73] Assignee: Lorillard Tobacco Company, New York, N.Y.

[21] Appl. No.: 676,577

[22] Filed: Feb. 28, 1991

[51] Int. Cl.$^5$ .............................................. A23K 3/02
[52] U.S. Cl. ................................... 131/290; 131/296; 426/419
[58] Field of Search ...................... 131/290, 296, 900; 426/419

[56] References Cited

U.S. PATENT DOCUMENTS 4,987,745 1/1991 Harris ............................. 426/419 X

OTHER PUBLICATIONS

Sonsino, Steven "Plastics Keeps ripeness under wraps", New Scientist Aug. 14, 1986 pp. 35-38.
Use of Carbon Dioxide to Disinfest a Tobacco Warehouse of the Cigarette Beetle; Keever, 1989, J. Agric. Entomol., vol. 6, pp. 43-51.
Methods of Applying Carbon Dioxide for Insect Control in Stored Grain, E. Jay, Dept. of Agriculture ATT-S-13, Apr. 1980.
Mortality of Stored-peanut Insects Exposed to Mixtures of Atmospheric . . . , Harein, 1968, J. Stored Prod Res., vol. 4, pp. 77-82.
Mortality of the Cigarette Beetle in High-Carbon Dioxide Atmospheres; Childs, 1983, J. Economic Entomology vol. 76, pp. 544-546.
Carbon Dioxide for Control of an Insect Infestation in Stored Corn (Maize), Jay, 1973, J. Stored Prod. Res., vol. 9, pp. 25-29.

Primary Examiner—Vincent Millin
Assistant Examiner—J. Doyle
Attorney, Agent, or Firm—White & Case

[57] ABSTRACT

A disinfestation system for agricultural products, for example recovered tobacco, comprises a disinfestation unit which is releasably connected to plural containers. The disinfestation unit supplies a disinfestation gas ($CO_2$) through the conduit means to the container, and periodically withdraws sample gas from said container. A thermal conductivity detector produces an electrical signal representation of the level of $CO_2$ in the container, which is supplied, along with a temperature dependent signal, to a computer. The processor controls the introduction of additional $CO_2$ throughout the process. Preferably, the system also includes heater elements, and the processor generates control signals for controlling temperature in the container. The computer controls the disinfestation process of multiple containers such multiple disinfestation processes can be carried out simultaneously.

15 Claims, 8 Drawing Sheets

DISINFESTATION SYSTEM FOR AGRICULTURAL PRODUCTS

FIELD OF INVENTION

The present invention relates to a method and apparatus for treating tobacco and other agricultural products for insect infestation.

BACKGROUND OF THE INVENTION

A major pest of stored tobacco and tobacco products is the cigarette beetle, *Laisoderma serricorne*. During the past 50 years, toxic fumigants such as hydrogen cyanide, methyl bromide, and hydrogen phosphide have been used to fumigate tobacco and other agricultural products for control of the cigarette beetle and other stored product insects. Usage of these and other fumigants has become increasingly restricted during the past several years because of regulatory agencies' concern with worker exposure to pesticides, pesticide residue on agricultural products, fumigant flammability, and contamination of air and water. As a result of these and other regulatory actions, hydrogen phosphide has become the fumigant of choice for disinfestation of stored agricultural commodities and products. Hydrogen phosphide ($PH_3$) is the toxic gas released when formulations of aluminum or magnesium phosphide are exposed to air. Although phosphide fumigants are considered relatively safe to use, they are classified for restricted use only by the Environmental Protection Agency (EPA). Therefore they must be applied only under the supervision of certified or licensed applicators. Usage of phosphide fumigants has become more restricted and controlled during the past three years as a result of emergency planning and reporting requirements that were specified in Title III of the Superfund Amendments and Reauthorization Act (SARA) of 1986, and labeling changes made by the 1987 EPA Amended Registration Standard for Phosphide Fumigants. Moreover, states and localities are now beginning to establish regulatory limits on amounts of hydrogen phosphide and other chemicals that are emitted into the atmosphere. When used as a fumigant, hydrogen phosphide is released into the atmosphere after the fumigation period has ended, i.e., during the period of warehouse aeration.

An alternative to toxic fumigants for disinfestation of agricultural commodities and products is asphyxiation of insects by means of low oxygen environments. This derives from the ancient practice of hermetic storage where grains, beans, etc., were stored for extended periods in sealed underground pits. In such an environment, the respiration of both the commodity and insects present in the commodity depletes oxygen to a level of approximately 2 percent, and increase carbon dioxide content to about 13 percent.

Although hermetic storage is still practiced in a few mid-eastern countries, it is now considered impractical as a modern means of insect control for agricultural products. The use of modified atmosphere by other means, however, is effective and practical for control of stored product insects. In a modified atmosphere, disinfestation occurs much faster than with hermetic storage; but like hermetic storage, there is no chemical residue left to remain in the product. Modified atmosphere occurs when the existing atmosphere within a storage or container is purged and replaced with carbon dioxide, nitrogen, or combustion gases.

Carbon dioxide is readily available in most localities as a compressed liquid or solid (dry ice). $CO_2$ is considered generally safe for workers in concentrations up to the Threshold Limit Value (TLV) of 10,000 ppm, compared to 0.3 ppm for hydrogen phosphide. It is also nonflammable, exempt from residue tolerance limits required by EPA for most raw and processed agricultural products, and aerates rapidly from treated commodities.

In recent years, numerous investigators have reported on the advantages of carbon dioxide for protection of agricultural products against insects. See Childs, D. P., Overby, J. E., "Mortality of the Cigarette Beetle in High-Carbon Dioxide Atmosphere," J. Econ. Entomology 76:554-546, 1983; Harein, P. K., Press, A. F. Jr., "Mortality of Stored-Peanut Insects Exposed to Mixtures of Atmospheric Gases at Various Temperatures," J. Stored Prod. Res. 4: 77-82, 1968; Jay, E. G., Pearman, G. C. Jr., "Carbon Dioxide for Control of An Insect Infestation in Stored Corn (Maize)," J. Stored Prod. Res. 9: 25-29, 1973; Keever, D. W., "Use of Carbon Dioxide to Disinfect a Tobacco Warehouse of Cigarette Beetles," J. of Agri Entomology 6: 43-51, 1989; and USDA, "Methods of Applying Carbon Dioxide for Insect Control in Stored Grain," USDA, Sci. and Ec. Asms, Advances in Agri Technology, AAt-S-13/April 1980. These reports on laboratory and field experiments have shown that $CO_2$ is an effective disinfestant for control of the cigarette beetle and other stored product insects. The basic method of treatment used by these investigators is as follows: Products to be disinfested are placed into a closed container or chamber. The container is equipped with a purge or exhaust port and a port for admitting $CO_2$. As pressurized $CO_2$ is injected into the container, the ambient air is evacuated through the exhaust port. When the concentration of $CO_2$ reaches the desired level within the container, the exhaust port is closed and $CO_2$ supply is turned off or reduced to a lower flow rate. During the period of disinfestation, $CO_2$ concentration is monitored periodically (i.e., on 12 or 24 hr cycles). When the concentration decreases below the desired level, additional "make-up" $CO_2$ is added by manual operation of switches and valves. For monitoring $CO_2$ levels, air from inside the chamber is aspirated through a gas sampling line (i.e., polyethylene tubing) by manual means utilizing a hand held bellows, a piston-type pump, or a battery-operated suction pump. A color-changing detector tube, through which a calibrated volume of air is drawn by the pump, indicates the $CO_2$ concentration.

The time required for complete disinfestation of a container or chamber varies from a few days to approximately two weeks. Variables affecting this time requirement are $CO_2$ concentration within the chamber and temperature of the tobacco or tobacco products. The quantity of $CO_2$ required is also dependent on product temperature, $CO_2$ concentration, and how well the chamber is sealed against leaks. In colder weather, additional heat is usually required to warm the product in order to increase the respiration rate of insects. The rate of insect kill is directly proportional to both $CO_2$ concentration and temperature.

During the period of disinfestation, especially the first 24-48 hours, $CO_2$ concentration decreases from the initial level. The decrease occurs as a result of leakage from the chamber and absorbance of $CO_2$ by the product. In order to minimize such fluctuations in $CO_2$ concentration, it is necessary to make periodic measurements on-site, followed by manual adjustments to supply additional $CO_2$. If close control of $CO_2$ concentration is desired, round-the-clock attention is required. If close control is sacrificed, excessive amounts of $CO_2$ may be used in order to ensure that the minimum concentration is maintained.

For these reasons, proposals to date for $CO_2$ use are generally impractical for any large scale commercial applications. It would be desirable to provide an apparatus for treating large quantities of agricultural products, which is automatic in operation, and which ensures a proper application of $CO_2$ or other treatment gas. It would also be desirable to provide a system which treats products contained in mobile storage containers, and which can carry out a disinfestation process independently on multiple containers.

SUMMARY OF THE INVENTION

The invention described herein provides a method and automated apparatus to continuously monitor and control $CO_2$ and temperature by remote means. The invention utilizes an apparatus controlled by a microprocessor to continuously measure $CO_2$ at any specified time frequency (e.g., hourly). When the concentration of $CO_2$ decreases to a specified lower limit (e.g., 1% below the specified level), additional make-up $CO_2$ is automatically added.

More particularly, the invention provides a method and apparatus for automatically fumigating returned cigarette packs utilizing carbon dioxide ($CO_2$) in multiple fumigation chambers.

The apparatus includes:
(a) A computerized measurement and control system
(b) $CO_2$ storage
(c) A $CO_2$ sampling and distribution system
(d) A $CO_2$ analyzer
(e) A fumigation containment system
(f) A heating system A fumigation containment system comprises a sealed enclosure into which returned cigarette packs are loaded and in which $CO_2$ concentration and interior temperature are controlled. These items collectively provide $CO_2$ concentration and temperature control for the sealed fumigation container, and permit operator interfaces, data collection, and reporting systems.

Other important aspects of this invention are as follows: The system is self-calibrating; it will monitor and control the $CO_2$ level in multiple containers or chambers; it eliminates labor requirements and materials cost for manually monitoring and maintaining $CO_2$ levels; it provides a data base for computing leak rates and disinfestation cost for each container or chamber.

For a better understanding of the invention, reference is made to the following detailed description of a preferred embodiment, taken in conjunction with the drawings accompanying this application.

DETAILED DESCRIPTION OF A PREFERRED EMBODIMENT

Figure 1:
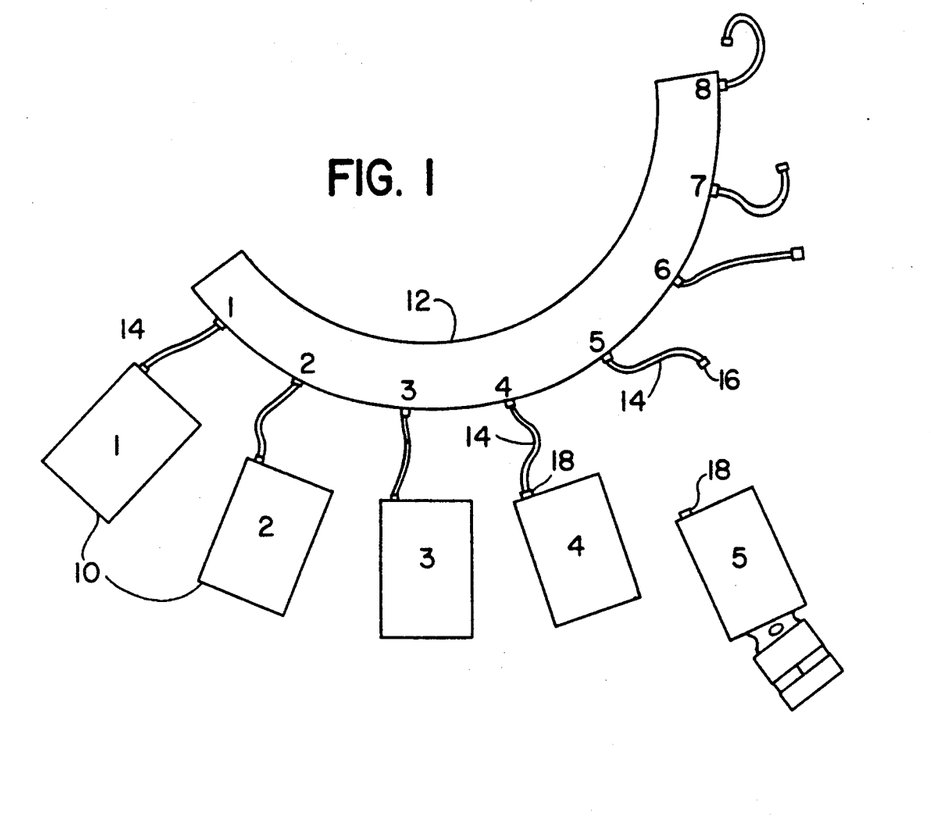
FIG. 1 is a schematic pictorial view of a disinfestation system according to the invention.

Referring to FIG. 1, in an exemplary embodiment, a system according to the invention includes a plurality of trailers 10 which can be connected to a disinfestation unit 12 through a flexible connector hoses or umbilicals 14. As shown, one end of each umbilical 14 is connected to the unit 12 whereas the free end has a connector element 16 which releasably couples to a mating element 18 on each trailer 10.

In the exemplary embodiment, there are eight connector bays to accommodate up to eight trailers 10 simultaneously. However, the number of connector bays is a matter of choice in that the system will readily operate with a greater or fewer number, and the system does not require all umbilicals to be connected in order to run. For purpose of illustrating the invention, FIG. 1 shows four (#1–4) trailers connected to their respective bays, and a fifth trailer (#5) being backed into place for connection to umbilical 14.

Figure 2:
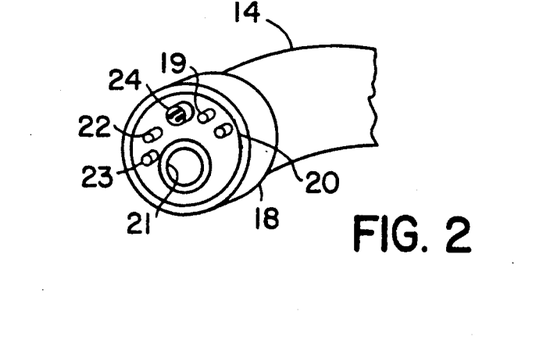
FIG. 2 is a perspective view of a flexible hose connector used in the system of FIG. 1.

As shown in FIG. 2, umbilical 14 preferably carries multiple hook up members, in this case a gas sampling hose 20, a $CO_2$ supply hose 21, and four 19,22,23,24 electrical cables. Connector 18 is shown without actual coupling hardware, but any type of known coupler may be employed.

Figure 3:
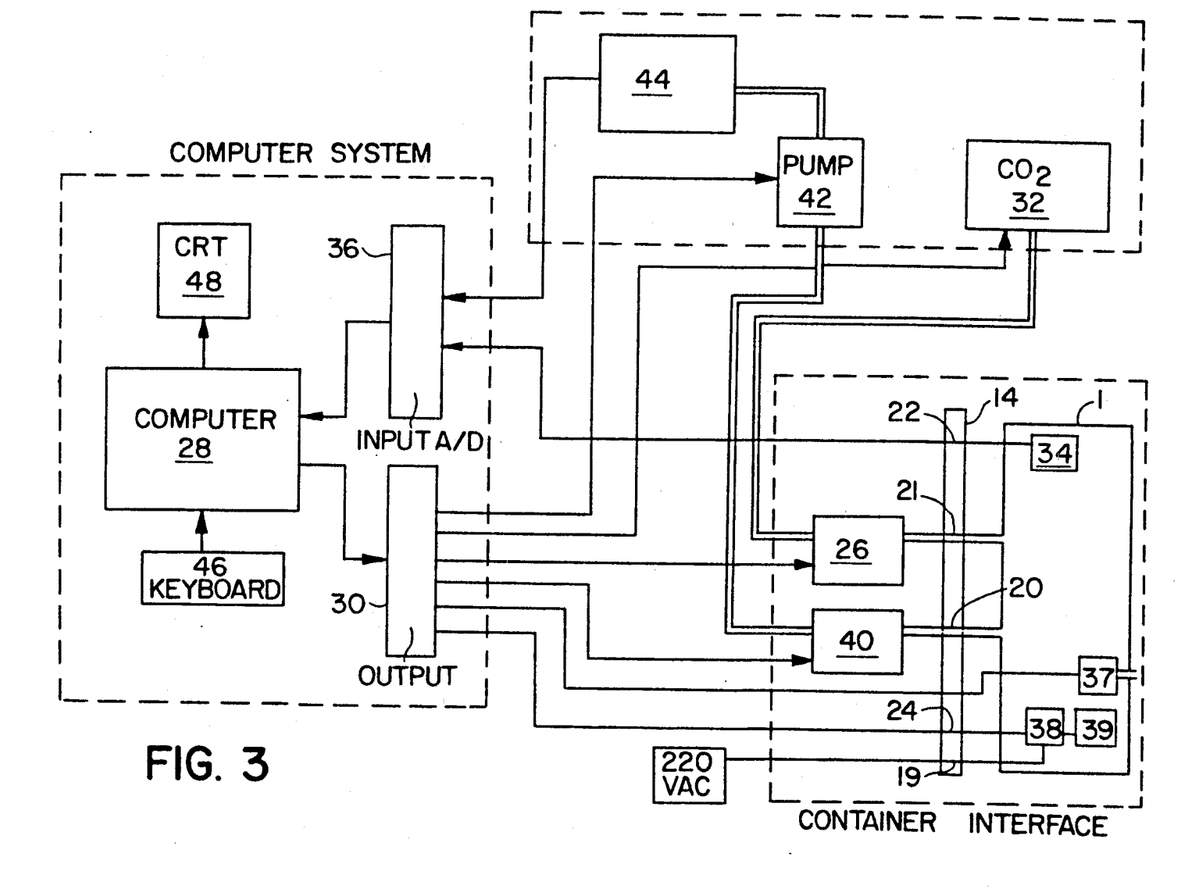
FIG. 3 is an operational block diagram of the system.

FIG. 3 shows an operational block diagram for the unit 12 and trailer #1 which includes a computer unit, a $CO_2$ analyzer and supply, and container interface. The computer unit includes a computer 28, a keyboard 46, a CRT 48, inputs 36 and outputs 30. The $CO_2$ analyzer and supply unit includes a $CO_2$ source 32, a pump 42, and a $CO_2$ analyzer 44 which provides a signal to computer input port 36. The container interface includes trailer 1, umbilical 14, gas lines 20 and 21, and electrical cables 19,22,23,24. It also includes a temperature transmitter 34 providing a signal to computer input 36 over cable 22, a $CO_2$ fill valve 26, $CO_2$ sampling valve 40 assembly, and heater relays 38, which control a heater assembly 39. The trailers are provided with any suitable temperature sensing instrument 34, such as a resistance temperature device (RTD), and with a purge control valve 37 connected to atmosphere through the trailer roof. $CO_2$ fill valve 26 is connected to $CO_2$ source 32 and controlled by a signal from computer output 30. $CO_2$ sampling valve assembly 40 is connected to pump 42 and controlled by a signal from computer output 30. Heater relay 38 and trailer purge valve 37 are also controlled by a signal from computer output 30, over electrical cables 24, 23 respectively. Electrical cable 19 is connected at one end to a power source, such as 220 VAC, and at its other end to heater relay 38, for providing current to heater assembly 39.

Figure 4:
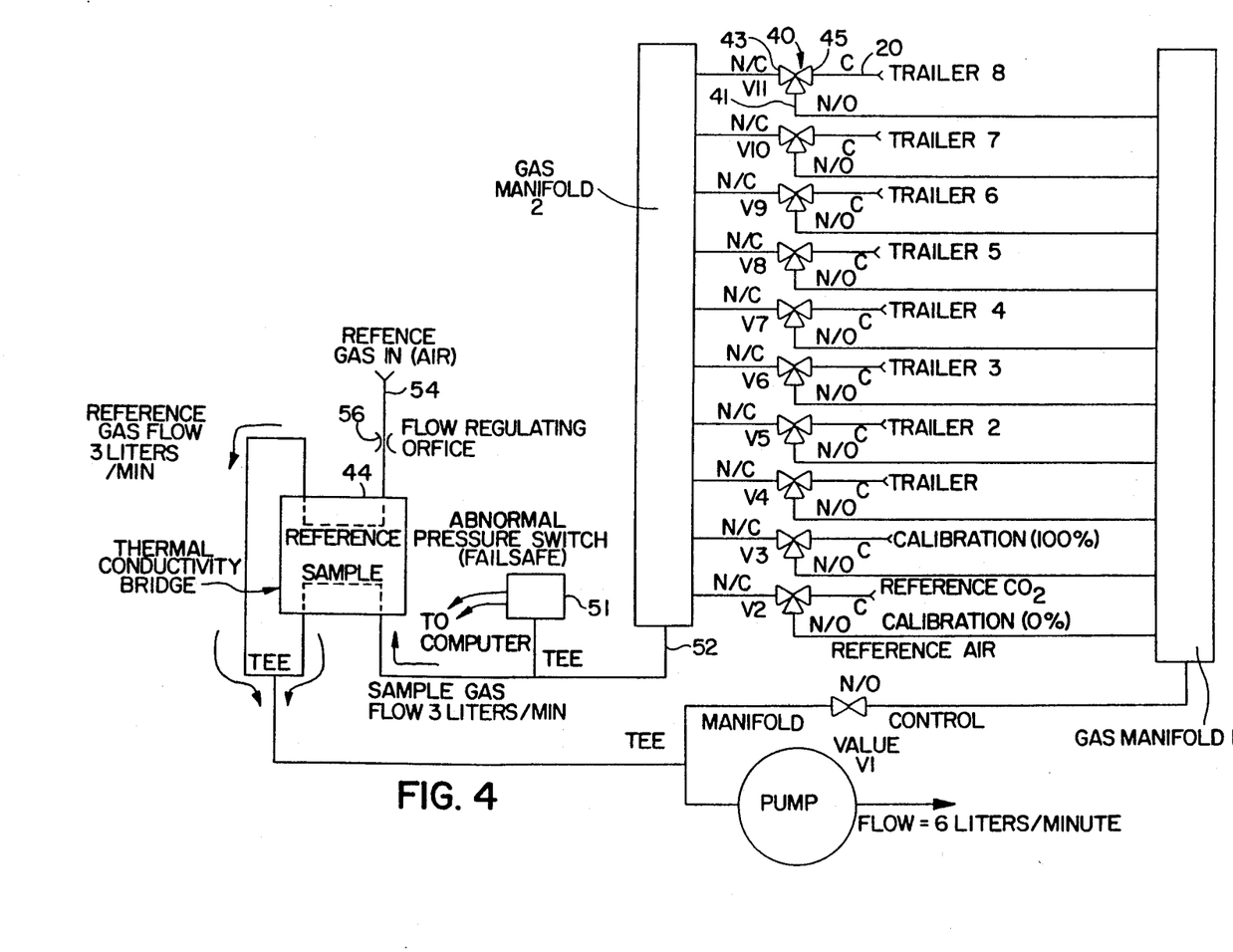
FIG. 4 is a schematic of the valve system control.

In the system of FIG. 1, there is a container interface associated with each trailer hookup. FIG. 4 shows in greater detail the valve system for the FIG. 1 system, containing eight trailer connectors.

For each of the trailers 1–8, sampling hose 20 is connected to a $CO_2$ sampling valve assembly 40. FIG. 4 shows eight $CO_2$ sampling valve assemblies, labelled V4–V11. Each $CO_2$ sampling valve assembly 40 includes an inlet port 45, connected to hose 20, a normally open (N/O) port 41 connected to Gas Manifold 1, and a normally closed (N/C) port 43 connected to Gas Manifold 2. Valve assemblies V4-V11 are each selectively actuated by an output signal from the computer 28, which closes port 41 and opens port 43 to redirect flow from Gas Manifold 1 to Gas Manifold 2.

The valve system of FIG. 4 also includes valve assemblies V2 and V3, which are similar in construction to valves V4-V11. The inlet port to valve V2 is connected to a reference gas, which is preferably air, whereas the inlet port to valve V3 is connected to carbon dioxide source 32.

Gas Manifold 1 is connected through a normally open manifold control valve V1 to pump unit 42. Pump unit 42 is turned on and off responsive to a signal from computer 28.

Gas manifold 2 is connected to the inlet side of $CO_2$ analyzer 44, which is a thermal conductivity bridge. An abnormal pressure switch 51 is teed into the sample inlet line 52, which acts as a fail safe in the event of a blocked line, as described further below.

Reference gas, e.g., air, is also drawn into the $CO_2$ analyzer 44 through gas inlet 54 and flow regulating orifice 56, e.g., a 3/32 inch diameter orifice. The gas outlets from the $CO_2$ analyzer 44 are connected to pump 42 having a capacity, e.g., of 6 liters per minute. Orifice 56 is sized such that flow through line 52 is the same as line 54, e.g., 3 liters per minute each.

Figure 5:
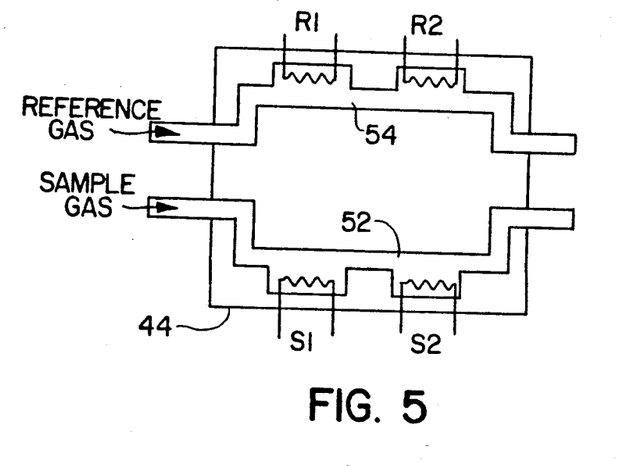
FIG. 5 is a schematic diagram of a thermal conductivity detector.
Figure 6:
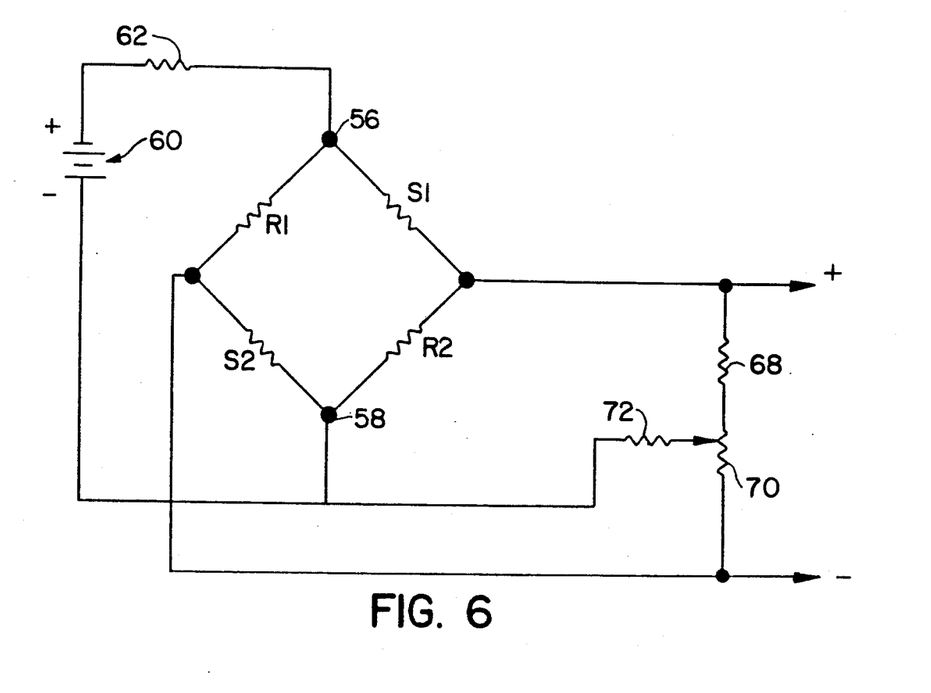
FIG. 6 is a circuit diagram of the thermal conductivity detector bridge.

FIGS. 5 and 6 illustrate the $CO_2$ analyzer 44, which is a thermal conductivity bridge, in greater detail. Reference gas in line 54 flows past a pair of resistance elements R1, R2 in the form of resistance wire filaments. Sample gas in line 52 flows past another pair of resistance elements S1 and S2 in a similar fashion.

Referring to FIG. 6, resistance elements R1, R2, S1 and S2 are arranged in a bridge, with the reference resistance elements and sample elements being respectively opposed from one another. Opposite sides of the bridge 56, 58 are connected across a power supply 60, e.g., 24 vdc, through a resistor 62, e.g., a 220 Ω, 5 w current limiting resistor. The remaining sides 64, 66 of the bridge are connected across a pair of resistors 68, 70, each of which may be a 10 kΩ, ¼ watt resistor. Bridge output 58, in turn, is connected to resistor 70 through a resistor 72, which may be a 2.2 kΩ, ¼ watt resistor. The positive and negative outputs 74, 76 from the $CO_2$ analyzer are fed to computer input 36 for analog-to-digital conversion (FIG. 3), and provide a signal representative of $CO_2$ concentration. The thermal conductivity bridge is of a type generally known and need not be described further.

Figure 7:
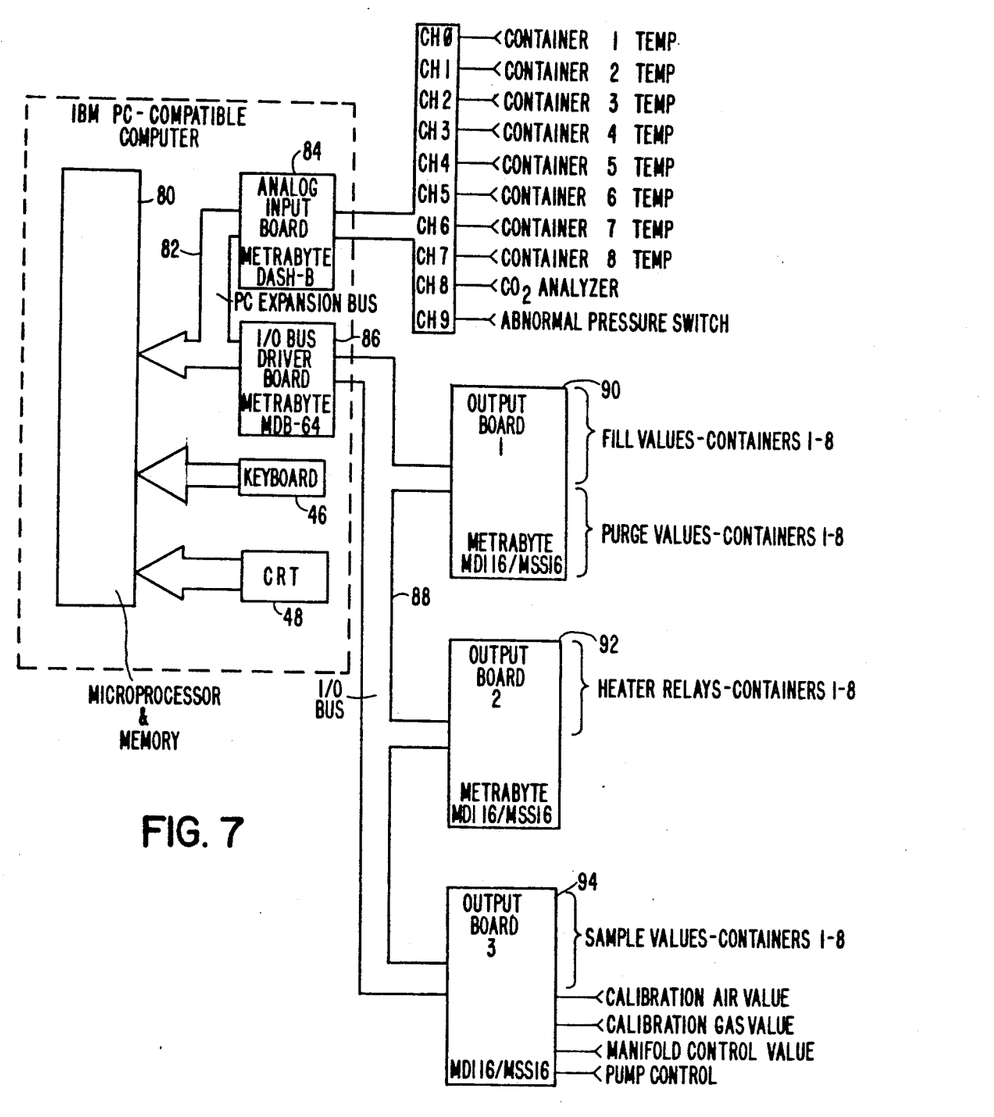
FIG. 7 is a block diagram of the computer system.

FIG. 7 shows in greater detail an example of a computer control system for use with the present invention. The system may operate with any suitable computer, such as an IBM-compatible PC, which includes a microprocessor and memory 80. The system preferably includes a CRT monitor 48 and keyboard 46, which are used to initiate operations of the system. In the example of FIG. 7, the system includes a PC expansion bus 82, which is connected to an analog-to-digital input board 84, e.g., a Metrabyte Dash-8, and an I/O bus driver board 86, e.g., a Metrabyte MDB-64, which is in turn connected to an I/O bus 88. I/O bus 88 is connected to three digital output boards 90, 92, 94, e.g., Metrabyte MDI16/Mss16. Output board 90 provides control signals to the fill valve 26 for each trailer 1-8, and to the trailer purge valves 37 of each trailer (FIG. 3).

Output board 92 provides control signals to the heater relays 38 for containers 1-8. Output board 94, in turn, provides control signals to the sampling valve assemblies 40 (V4-V11), to calibration air valve V2, to calibration valve V3, to manifold control valve V1, and to the pump 42.

Figure 8A:
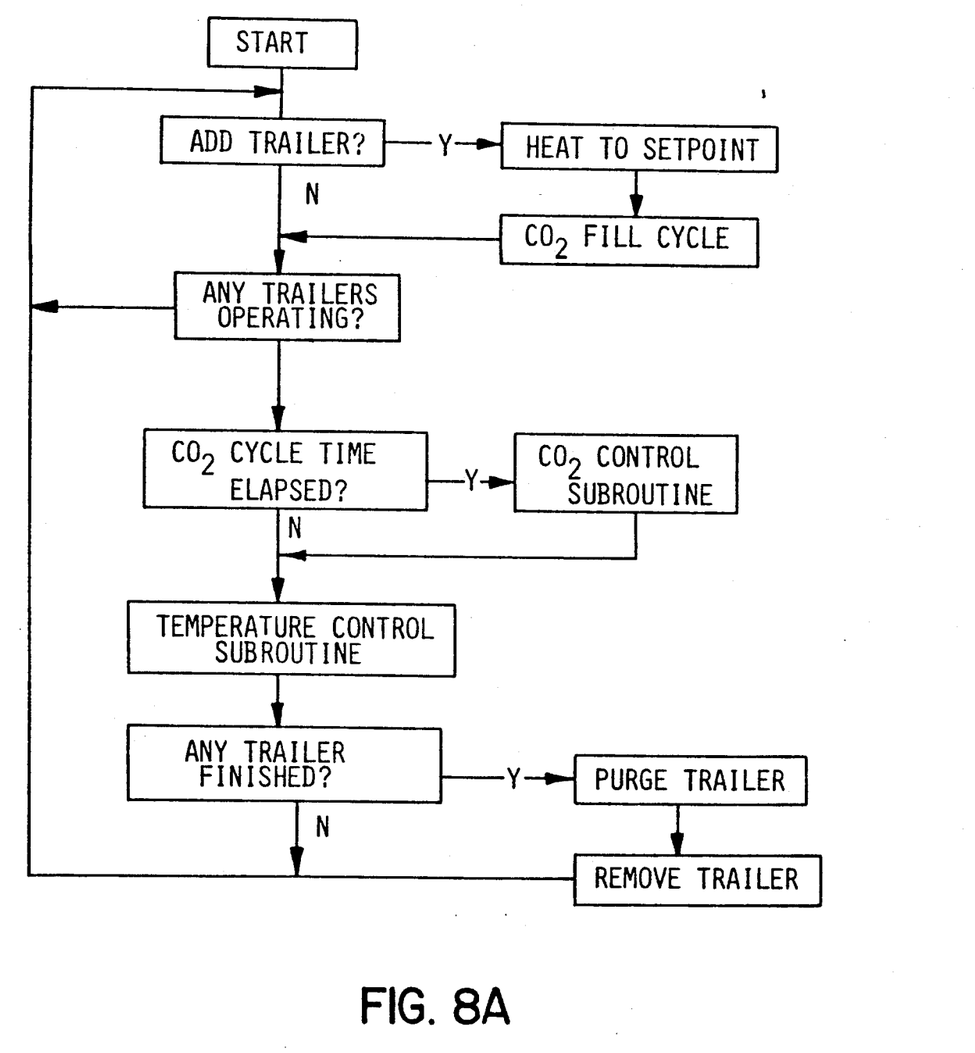
FIGS. 8A–8C is a flow diagram of a control program.
Figure 8B:
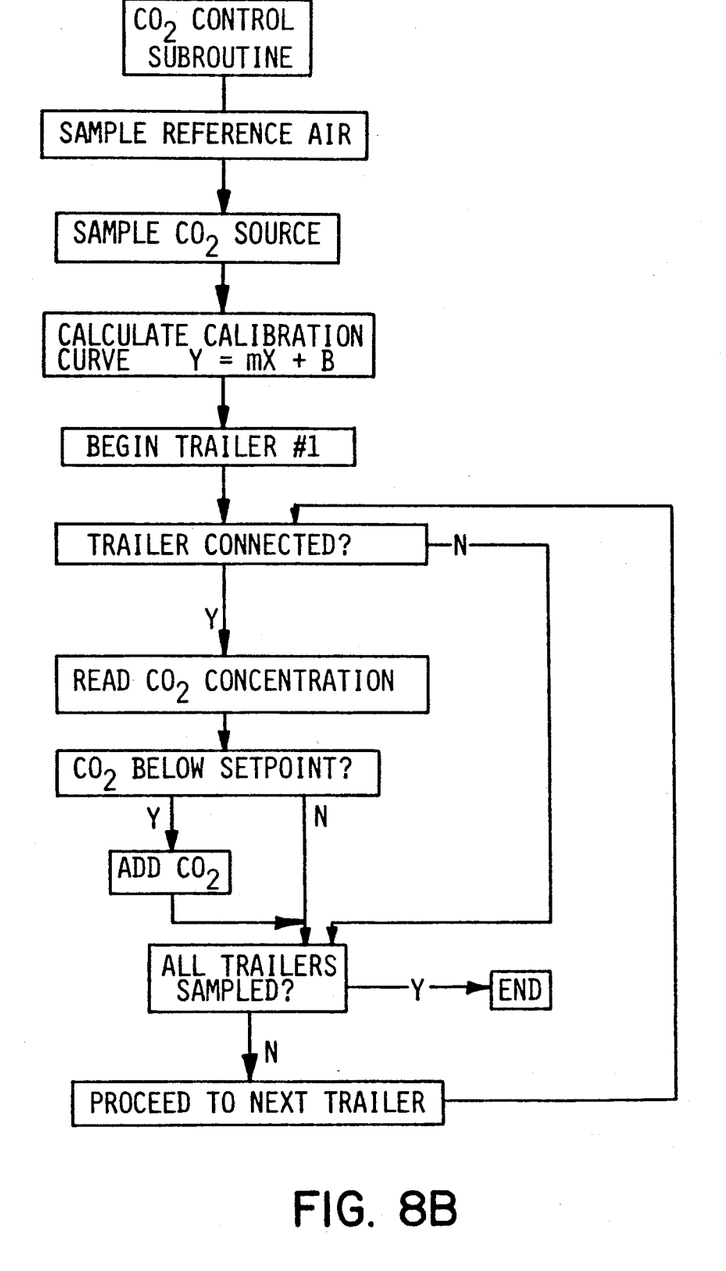
Figure 8C:
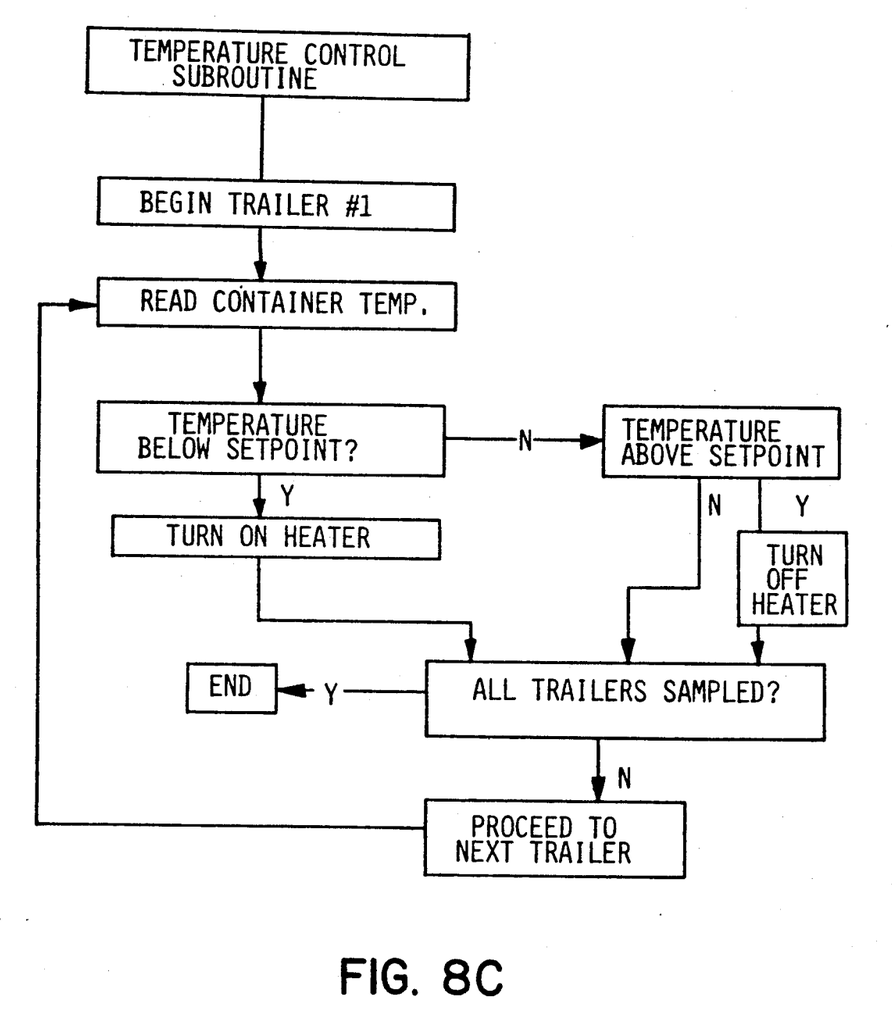

FIGS. 8A-8C are a flow diagram of an exemplary control program for the computer. As shown, the computer detects which of the trailers are connected, and carries out the disinfestation process on each of the connected trailers. When another trailer is connected into the system and the operator initiates the process, the program carries out an initial heat and fill cycle on the newly connected trailer, and then adds the newly connected trailer to the temperature and concentration polling subroutines carried out on the trailers already undergoing processing. The computer tracks the time, temperature, and concentration for each trailer and concludes the process for each trailer at the appropriate time. The process carried out for each trailer is described further below.

Example of System Operation

Cigarette packs are arranged in the container (trailer) #1, which is sealed and connected to the umbilical 14. The computer operator then inputs a start command into the computer 28, through keyboard 46, to initiate a disinfestation cycle for trailer #1. Other trailers may already be undergoing disinfestation cycles at the time.

The computer may adjust temperature prior to filling the container with carbon dioxide, or may defer this operation until later. In the former case, an initial temperature reading is taken from unit 34, and if necessary heater relays 38 are activated. Temperature readings are monitored by the computer 28 until the desired container temperature is reached, at which time relays 38 are deactivated.

The $CO_2$ fill valve 26 is actuated by the computer 28 through the computer output subsystem 30, providing an initial charge of $CO_2$ from storage tank 32 into the trailer 1. The computer then acquires a signal proportional to the container interior temperature from the temperature transmitter 34 through the computer input subsystem 36. Interior temperature is calculated, compared to a predetermined set point value, and stored. Heater relay 38 is actuated by the computer output subsystem to maintain the interior temperature at or above the set point value. The container interior temperature is continually monitored and controlled in this fashion throughout the fumigation cycle.

Periodically, a $CO_2$ sampling valve assembly 40 is actuated by the computer, allowing a pump 42 to draw a sample of the container atmosphere into a $CO_2$ analyzer 44. The $CO_2$ analyzer then provides an output signal to the computer input subsystem which is proportional to $CO_2$ concentration in the container. The computer calculates the percent $CO_2$ concentration from this signal, which value is stored. The computer also compares the concentration value to a predetermined set point. A concentration below the set point value causes the computer output subsystem to actuate the $CO_2$ fill valve 26 for a predetermined time interval, again injecting a charge of $CO_2$ from the $CO_2$ storage tank 32 into the fumigation container.

The $CO_2$ concentration and temperature in the fumigation container are maintained for a preset time interval, after which the computer system terminates the fumigation process. Preferably, at the termination of fumigation the computer is programmed to report the temperature and $CO_2$ concentrations throughout the cycle. Operator setup is performed through the computer keyboard 46 and system performance is monitored via the CRT display 48.

The foregoing describes the system operation carried out with respect to one trailer connected to the system. In the case where multiple trailers are connected, the sequence for each trailer is initiated individually through the keyboard, and the computer stores measured temperature, concentration values, and elapsed cycle time for each trailer separately. However, as set out in FIG. 8, once a cycle begins for a trailer, the temperature and concentration values are measured along with all other connected trailers. In this manner, the temperature of each trailer is continuously monitored by polling sequentially each connected trailer. Also, in undertaking a concentration measurement, the computer 28 conducts the initial calibration steps and then measures all of the trailers at such time. This control sequence is merely illustrative and other sequences may be employed.

Sampling Sequence

When $CO_2$ concentration is to be sampled, computer 28 directs an output signal through output board 94 to the pump control, to turn on pump 42. With no power applied to normally open valve V1 and valves V2-V11, gas flows from each input line 20 through each valve's normally open purge port (marked N/O), through gas manifold 1 and manifold control valve V1, and is exhausted to atmosphere through pump 42. This clears all gas sample lines of existing gases which might bias gas measurements in the following steps. This clearing continues for two minutes.

Pump 42 remains on and power is applied to manifold control valve V1, closing valve V1 such that flow is blocked to the pump through this path. Power is applied to valve V2, allowing calibration air (i.e., zero level $CO_2$) to be drawn by the pump through gas manifold 2 and into the $CO_2$ analyzer 44 through line 52. Reference air is simultaneously drawn through the reference side of the thermal conductivity bridge, through line 54, by the pump 42. Flow regulating orifice 56 provides regulation of reference gas flow to match sample gas flows determined by the orifice size in each of the control valves, thus providing balance of the flows in each side of bridge.

The sample gas is allowed to flow for thirty seconds to allow the bridge and associated tubing to arrive at a steady state condition. An analog-to-digital (A/D) reading of the bridge output is directed to the computer 28 from computer input board 36. The voltage thus obtained is proportional to the concentration of $CO_2$ in the calibration air line. At this time both the reference and sample paths through the bridge contain the same zero-level $CO_2$ flow (ambient air), and the bridge output will be near zero (null). Therefore, this reading becomes the zero point on the bridge calibration curve to be calculated by the computer.

Power is removed from valve V2 and applied to valve V3. Valve V1 remains powered, such that no flow is allowed through V1. Calibration $CO_2$ (100% $CO_2$) is then drawn from the $CO_2$ supply tank through gas manifold 2, valve V3, and into the sample side of the bridge. The sample gas is allowed to flow for thirty seconds to achieve equilibrium flows throughout the measurement system. An A/D reading of the bridge electrical output is again performed, providing a voltage proportional to the concentration of $CO_2$ in the sample (i.e., 100%). This reading becomes the span, or upper limit, in the calibration curve to be calculated by the computer.

The computer 28 calculates the calibration curve for the bridge at this measurement interval using the assumption that the bridge is linear through the useful range. The equation used is $Y = mX + b$, where Y equals the instantaneous level of $CO_2$, X is the instantaneous A/D voltage reading, and m and b are the slope and Y intercept, respectively, as calculated from the baseline and span measurements made above.

The computer 28 then sequentially actuates valves V4-V11, to take sample readings for each of the trailers that are attached to umbilicals 14, and calculates the level of $CO_2$ in each trailer. The computer continuously scans the A/D inputs, and is aware of which trailers are actually connected by examining the temperature transmitter channels. Disconnected umbilical cables cause the RTD transmitter to read open circuit, indicating abnormally high temperature to the computer, which then considers the trailer disconnected and discontinues any control of that channel. $CO_2$ content for each connected trailer is measured by energizing the $CO_2$ sampling valve 40 associated with that single channel, allowing equilibrium of the system, and making an A/D reading of the bridge output. $CO_2$ concentration is then calculated from the calibration curve determined above.

Under colder weather conditions, sample gas pulled from the trailers pass from a warm region inside the trailer to a cool region external to the trailer. This may cause sweating and possible freezing of condensate in the sample lines. This condition can plug the sample line, causing the computer to sense that $CO_2$ concentration is too low in the trailer, upon which unnecessary charging of the trailer may take place. Abnormal pressure switch 51 is connected to sense the presence of unbalanced pressure in the sample line feeding the bridge, which occurs under a blocked sample line condition. Switching of abnormal pressure switch 51 is sensed by the computer should blocked line conditions occur. The computer then terminates fumigation of the flow-blocked trailer system and notifies the operator through the CRT display 48.

If the gas calculation for an individual trailer is sufficiently below the established set point at which tobacco beetle kills are optimum, $CO_2$ must be added to the trailer. The computer then turns on the $CO_2$ fill valve 26 for the corresponding trailer umbilical, flowing $CO_2$ from the $CO_2$ supply tank 32 into the trailer. This flow is allowed to continue for a set time interval before the $CO_2$ fill valve is again turned off. If the $CO_2$ injection is the first injection in a fumigation cycle, the trailer will be at low $CO_2$ concentration and the time interval can be set up to twenty minutes to provide a longer initial charging of the trailer volume. Further, during any initial $CO_2$ charging cycle, trailer purge valve 37 is energized to allow heavier $CO_2$ injected into the bottom of the trailer to force lighter air out the trailer purge valve 37 located at the top of the trailer. If this initial charging has previously been performed, the time interval is reduced to one minute to prevent overshoot beyond the $CO_2$ concentration set point. The procedure is repeated for each individual trailer the computer determines is on line at any interval and which has been initiated by an operator. The fumigation procedure continues for each trailer until the computer determines the fumigation time length has been reached, at which time the process is terminated, the operator is informed and data is presented via the CRT display 48.

Field Trials

The described invention may be used on a regular basis to monitor and control $CO_2$ disinfestation of one or several containers. For field tests, apparatus was installed to handle six tightly sealed 40 foot freight trailers of approximately 3,000 cubic feet each. A field test was conducted to demonstrate the described invention as an automated means for disinfestation of tobacco products. This field test is described below.

One of six trailers being used for $CO_2$ disinfestation was loaded with cases of packed cigarettes. Prior to loading, test packs were placed within the loaded trailer as follows: Eight test packs were placed on a six foot high shelf located inside the "thief door" at the front end of the trailer. Nine additional test packs were placed within cartons of cased cigarettes at the front, middle and rear of the trailer at heights of 1, 4, and 7 feet.

Each of the test packs contained two strains of fourth instar cigarette beetle larvae (*Laisoderma Serricorne F.*), tobacco reared and wheat flour/yeast reared. The larval stage of the beetle is the life stage most conveniently collected and handled for bioassay work, and is also the stage least susceptible to the effects of $CO_2$ at low concentration levels, i.e., 35%. Twenty-five larvae and approximately 0.2 grams of growth media were enclosed in a 3 cm×0.7 cm dia. paper tube. The paper tube was transferred to a 60-mesh wire cylindrical cage measuring 1 cm×4 cm. One cage of each larval strain was implanted into each of the test packs. Test packs were prepared as follows: A flap opening measuring 1.5×1.5 cm was cut with a razor blade into the bottom of a pack of 100 mm size cigarettes. Three cigarettes were removed from the pack and replaced with the two cages of beetle larvae. The flap opening was closed and the package was sealed with plastic transparent tape.

After the loaded trailer was closed, the computer program was initiated and disinfestation proceeded as follows: The trailer was pre-heated to 80° F. for 10 hours before introduction of $CO_2$. After the pre-heat period, $CO_2$ was introduced at 25 psi to purge the trailer of ambient air. At the end of the 25 minute purge period the purge value and $CO_2$ feed-in valves were automatically closed. At 30-minute intervals, temperature and $CO_2$ levels were monitored and increased if necessary, in order to maintain 35% $CO_2$ and 80° F. for 96 hrs. At the end of the 96 hr. disinfestation period, monitoring/control of $CO_2$ and temperature was terminated. The trailer remained closed for an additional 48 hrs., to allow static aeration to occur through the purge tube.

After commencement of the disinfestation period, test packs were removed at 12-hr intervals from the thief door location. When the disinfestation period was complete and the trailer unloaded (at the end of 144 hrs.), the remaining test packs were removed from the 9 locations within the cased cigarettes. Test packs were opened within 24–48 hours after removal from the trailer and the cages examined for dead beetles. The observed mortalities for insect exposure to 35% $CO_2$ for periods of 12 to 96 hrs. are shown in Table I. The mortality for those insects contained in the cased cigarettes for 144 hrs. is shown in Table II.

TABLE I

% Mortality of Cigarette Beetle Larvae
(in Packaged cigarettes located inside Thief Doors)

| Exposure Time | Wheat Flour Reared | Tobacco Reared |
|---|---|---|
| 12 hrs | 0 | 4 |
| 24 hrs | 0 | 4 |
| 36 hrs | 0 | 0 |
| 48 hrs | 12 | 12 |
| 60 hrs | 36 | 56 |
| 72 hrs | NR | NR |
| 84 hrs | 88 | 84 |
| 84 hrs | 80 | 80 |
| 96 hrs | 92 | 88 |

NR = Test pack was not removed from trailer

TABLE II

% Mortality of Cigarette Beetle Larvae After
96 hrs Disinfestation and 48 hrs Aeration
(Test packs distributed throughout the trailer)

| Exposure Location | Wheat Flour Reared | Tobacco Reared |
|---|---|---|
| Trailer Front @ Top | 100 | 100 |
| Trailer Front @ Middle | 100 | 100 |
| Trailer Front @ Floor | 96 | 100 |
| Trailer Center @ Top | 100 | 100 |
| Trailer Center @ Middle | 100 | 100 |
| Trailer Center @ Floor | 100 | 100 |
| Trailer Rear @ Top | 100 | 100 |
| Trailer Rear @ Middle | 100 | 100 |
| Trailer Rear @ Floor | 100 | 100 |

The foregoing represents a preferred embodiment of the invention. Variations and modifications of the apparatus and processes described herein will be apparent to persons skilled in the art, without departing from the inventive principles disclosed herein. For example, while the preferred embodiment of the invention employs carbon dioxide, the system may be operated with other gases. Also, instead of controlling temperature it is possible to vary the cycle time as a function of the measured temperatures. All such modifications and variations are intended to be within the scope of the invention, as defined in the following claims.

We claim:

1. An insect disinfestation system for agricultural products comprising:
   at least one transportable container having a sealable interior for containing an agricultural product, a heat generating means for selectively heating said interior, and a temperature sensing means for sensing the temperature of said interior; and
   a disinfestation unit including:
   (a) a connector means including a conduit means, first and second electrical cables, means for releasably coupling said conduit means with said container for communicating with the container interior, and means for releasably connecting said first and second cables to said temperature sensing means and said heat generating means, respectively;
   (b) means responsive to a first control signal for supplying a disinfestation gas through the conduit means to the container interior;
   (c) means responsive to a second control signal for withdrawing sample gas from said container interior through the conduit means;
   (d) means responsive to a third control signal for actuating said heat generating means;

(e) means connected to said first electrical cable for producing an electrical temperature signal representative of temperature inside the container;

(f) means communicating with the conduit means for producing an electrical gas concentration signal representation of the level of disinfestation gas in samples withdrawn from the container interior; and (g) processor means for carrying out an insect disinfestation cycle, including means for periodically generating said second control signal, and program means for generating said first and third control signals as a function of the temperature and gas concentration signals, for maintaining a predetermined gas concentration level and minimum temperature inside said container during a disinfestation cycle, and for terminating said cycle after a period of time suitable for killing insects present in a selected agricultural product contained within said container.

2. A system according to claim 1, comprising a plurality of containers, and connector means for releasably connecting multiple containers simultaneously to the disinfestation unit, and wherein the program means includes means for carrying out disinfestation cycles independently for each container connected to the disinfestation unit.

3. A system according to claim 2, wherein said connector means comprises a plurality of umbilical members, each containing a conduit means and said first and second electrical cables.

4. A system according to claim 3, wherein each container further comprises a purge valve means, and wherein said disinfestation unit further comprises a source of disinfestation gas, a gas concentration analyzer, and a sampling valve means; wherein each conduit means includes a gas delivery line connected to the source of disinfestation gas and a gas sampling line connected to the sampling valve means; wherein each umbilical includes a third electrical cable and means for releasably connecting said third electrical cable to said purge valve means for receiving control signals from said processor means; and wherein the sampling valve means includes means for supplying sample gas from a selected umbilical to the gas concentration analyzer responsive to control signals from the processor means.

5. A system according to claim 4, wherein said program means includes means for determining which of the umbilicals are connected to a container; means for sequencing the connected containers for determining temperature; means for periodically sequencing the connected containers for determining gas concentration and for controlling addition of gas; and means for storing the elapsed cycle time for each container undergoing processing.

6. A system according to claim 1, wherein said disinfestation unit comprises a gas analyzer having means for comparing sample gas with a reference gas for generating said gas concentration signal, and a sample valve means for supplying sample gas to said gas analyzer selectively from said conduit means, from a source of reference gas, and from a source of disinfestation gas, and wherein said program means includes means for generating a baseline electrical signal responsive to supplying reference gas as the sample gas, means for generating an upper limit electrical signal responsive to supplying disinfestation gas as the sample gas; and wherein the processor means includes means for determining relative concentration of sample gas as a function of said gas concentration signal and said baseline and upper limit signals.

7. A system according to claim 1, wherein the means for producing an electrical gas concentration signal comprises a thermal conductivity bridge means, a reference air inlet passage, a sampling valve means for supplying sample gas from said conduit means to said bridge means, a pump connected to said air inlet passage and said sampling valve means for drawing air and sample gas from said container simultaneously through said bridge means, and constriction means in said inlet passage for setting a predetermined ratio of air-to-sample gas flow.

8. A system according to claim 7, further comprising a source of calibration air, a source of calibration disinfestation gas, and wherein said sampling valve means includes means for selectively supplying calibration air and calibration gas to said bridge means, in place of sample gas, for calibrating said bridge means.

9. A system according to claim 7, comprising connector means for releasably connecting multiple containers concurrently to said disinfestation unit, and wherein said sample valve means includes means for supplying gas to said bridge means from any container connected to the connector means.

10. A method of insect disinfestation for agricultural products comprising the steps of:

placing an agricultural product in a transportable container and sealing said container;

providing a temperature sensing means and a heat generating means in the container interior;

providing a disinfestation unit having a connector means including a conduit means and first and second electrical cables;

releasably coupling said conduit means with the container so as to communicate with the container interior;

releasably connecting said first and second cables to said temperature sensing means and said heat generating means;

introducing a disinfestation gas into said container interior through the conduit means responsive to a first control signal;

withdrawing sample gas from said container interior through said conduit means, responsive to a second control signal;

actuating said heat generating means responsive to a third control signal;

periodically producing an electrical temperature signal representative of temperature inside the container;

producing an electrical gas concentration signal representative of gas concentration in sample gas withdrawn from the container;

providing a processor means in said disinfestation unit, and providing the temperature and gas concentration signals to said processor means;

programming said processor means to:

determine temperature and gas concentration from the temperature and gas concentration signals received;

compare measured temperature and gas concentration values with predetermined concentration and temperature settings;

generate said first control signal responsive to gas concentration below a predetermined level to introduce an additional amount of disinfestation gas into the interior of the container;

generate the second control signal at preselected intervals for withdrawing sample gas; and generate said third control signal responsive to temperature below a predetermined value to maintain a predetermined minimum temperature; and automatically terminating the cycle after a predetermined time suitable for killing insects present in said agricultural product; and disconnecting said container from said disinfestation unit.

11. A method according to claim 10, comprising the steps of releasably connecting multiple containers concurrently to the disinfestation unit, supplying to the processor means temperature and gas concentration signals from each container, and generating separate first, second, and third control signals for each container; wherein said processor means is programmed to carry out disinfestation cycles independently for each container.

12. A method according to claim 11, comprising the steps of opening a purge valve in each container when supplying disinfestation gas, and of selectively supplying gas from the sampling line to a sampling valve means; and wherein the sampling valve means supplies sample gas from a selected container to a gas analyzer, responsive to control signals from the processor means, for generating said gas concentration signal.

13. A method according to claim 12, wherein the processor means determines which of the umbilicals is connected to a container; sequences the connected containers for determining temperature; periodically sequences the connected containers for determining gas concentration and for controlling addition of gas; and stores the elapsed cycle time for each container undergoing processing.

14. A method according to claim 13, wherein the gas analyzer compares sample gas with a reference gas and generates an electrical signal representative of the relative concentration of disinfestation gas present in the sample gas; wherein the gas analyzer carries out a calibration process prior to sequencing the containers including the steps of generating a baseline electrical signal from a reference gas, and generating an upper limit electrical signal from a supply of disinfestation gas; and wherein the processor means determines relative concentration of sample gas from the baseline and upper limit signals.

15. A method according to claim 12, wherein the gas analyzer includes a thermal conductivity bridge, and wherein the step of determining concentration includes drawing sample gas and reference air simultaneously across said bridge, and wherein reference air is supplied through a constriction for setting a predetermined ratio of air-to-gas flow.

* * * * *